United States Patent [19]

Brunsch et al.

[11] Patent Number: 4,634,399

[45] Date of Patent: Jan. 6, 1987

[54] STRUCTURAL COMPONENT FOR TRANSMITTING TORQUE

[75] Inventors: Klaus Brunsch, Wolfratshausen/Weidach; Peter Sappl, Hausham; Bernd Bongers, Heimstetten, all of Fed. Rep. of Germany

[73] Assignee: Messerschmitt-Bölkow-Blohm GmbH, Munich, Fed. Rep. of Germany

[21] Appl. No.: 737,174

[22] Filed: May 23, 1985

[30] Foreign Application Priority Data

May 23, 1984 [DE] Fed. Rep. of Germany ....... 3419176

[51] Int. Cl.$^4$ ............................................... B62D 1/18
[52] U.S. Cl. ........................................ 464/87; 74/492; 280/777
[58] Field of Search ................... 74/492, 493; 280/775, 280/777; 464/78, 87, 88, 92, 106, 147, 153, 154, 181, 183

[56] References Cited

U.S. PATENT DOCUMENTS 3,177,684  4/1965  Bossler, Jr. ...................... 464/181 X
3,373,629  3/1968  Wight et al. ........................... 74/492
3,508,633  4/1970  Nishimura et al. ............... 74/493 X

FOREIGN PATENT DOCUMENTS 172245   8/1952   Austria .
2358594  5/1974   Fed. Rep. of Germany ........ 464/88
3045141  12/1982  Fed. Rep. of Germany .
3219629  12/1983  Fed. Rep. of Germany .
7922064  9/1979   France .
683833   12/1952  United Kingdom .
1154666  6/1969   United Kingdom .................. 74/492

*Primary Examiner*—Stuart S. Levy
*Assistant Examiner*—Daniel P. Stodola
*Attorney, Agent, or Firm*—Toren, McGeady & Goldberg

[57] ABSTRACT

A coil-shaped body is used to transmit torque between shafts spaced axially apart and with the shaft axes disposed angularly to one another. Such an arrangement is used in a bent steering column for a safety steering mechanism. The coil-shaped body is formed by winding a plastics material impregnated fiber strand around an axially extending mandrel so that the layers of the strand are in crossing relation. The crossing superposed layers form lattice bars between the crossover points of the body. The lattice rods have a radial dimension greater than the length of the strands. The angle of the lattice rods relative to the axis of the coil-shaped body is greater than 55°.

6 Claims, 6 Drawing Figures

STRUCTURAL COMPONENT FOR TRANSMITTING TORQUE

BACKGROUND OF THE INVENTION

The invention is directed to a structural component for transmitting torque between two shafts with the shaft axes being disposed angularly relative to one another, such as for a safety steering mechanism with a bent steering column.

In a front end motor vehicle collision to avoid that the rigid steering column is driven into the driver's space, it has been the practice to utilize steering columns which are doubly bent and provided with universal joints at the bent sections. Such safety steering columns involve a complicated and expensive design.

In another type of safety steering column used in actual practice, a portion of the steering column is designed as a lattice-like sleeve which compresses or shortens in the case of a front end collision when a predetermined force has been exceeded. The lattice-shaped sleeve can be formed as a member wound from a fiber-reinforced plastics material provided with lattice bars made up of layers of plastics material impregnated with fiber strands wound in a crossing pattern, German Patent document No. 30 45 141-C2. The angle of the lattice rods with respect to the axis of the wound member is preferably in the range of 45° to 55° since the intended purpose is to achieve a smaller axial strength than a small bending stiffness.

Accordingly, the known lattice-shaped sleeve is relatively stiff in bending and is able to compensate for angular deviations merely within the range of the fabrication tolerances.

SUMMARY OF THE INVENTION

Therefore, the primary object of the present invention is to provide a structural component for transmitting torque between shafts which are spaced axially apart and with the axes disposed angularly to one another, such as for use in a bent safety steering column, where the structural component can be manufactured at low costs and still be capable of transmitting high torque. This structural component fulfills all the requirements for the above-mentioned type of safety steering column.

By forming the structural component as a coil-shaped member formed of a plastics material impregnated fiber strand, the member can be produced on a conventional winding machine. Moreover, the structural component has a low weight and a considerably lower weight than the known structural component used in bent safety steering columns employing two universal joints. As distinguished from the known structural component, the structural component embodying the present invention operates over its entire useful life free of play and friction. Since the coil-shaped member forming the structural component is easily deformable in its elongated or axial direction, it can be installed in a safety steering column so that it can possibly absorb the axial stresses occurring in a front end collision.

The structural component embodying the present invention is, however, not limited to use in a bent steering column, rather it has general application to mechanisms where torque is transmitted between shafts which are arranged angularly relative to one another. As a result, the structural component of the present invention can be utilized as a flexurally bendable but torsionally stiff control shaft for blade angle control of helicoptor rotor blades which according to present day construction utilize flexurally stiff, torsionally yielding rotor blade connections.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
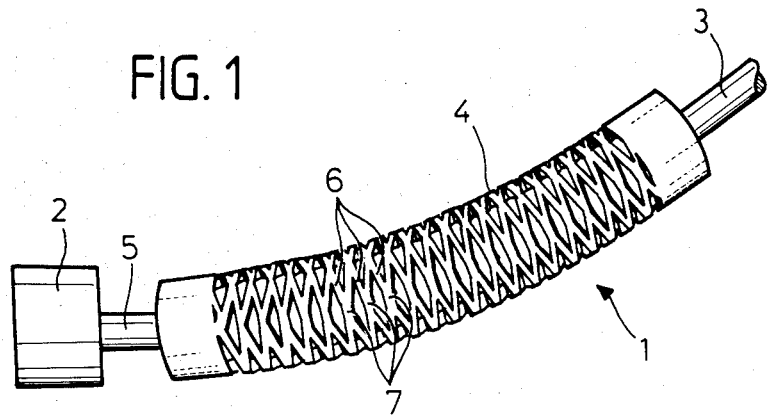
FIG. 1 is a side view of a structural component installed in a safety steering mechanism and extending between a steering gear and a steering column.

In FIG. 1 a structural component 1, embodying the present invention is located between a steering gear and a steering column in a safety steering mechanism. The structural component 1 is formed as a flexurally yielding coil-shaped body 4 formed of fiber reinforced plastics material in an open lattice-shaped structure. Drive shaft 5 of the steering gear 2 and the steering column 3 are disposed in axially spaced relation and their axes are disposed at about an angle of 35° with respect to one another. It can be appreciated in a front end collision involving a motor vehicle there would be displacement of the steering gear into the operator's space in the vehicle, however, with the steering component of the present invention a more pronounced bending of the coil-shaped body would take place and there would not be any transmission of axially extending stresses from the drive shaft 5 to the steering column 3 with the result that any displacement of the steering column into the operator space in the vehicle would be prevented.

The lattice-form coil-shaped body 4 is constructed with the fiber strands, impregnated with a synthetic resin binder, or rovings, wound in accordance with known technology onto a winding mandrel in a winding or coiling machine with the mandrel having a polygonal or circular cross-section. The lattice structure corresponds to a multiple winding pattern without advancing order, that is, the fiber strands are deposited one on the other in the winding operation.

As viewed in FIG. 1, lattice rods 6 of the coil-shaped body 4 refers to the fiber strand layers extending between adjacent crossing location or strand layer intersections 7. The lattice rods 6 are disposed at an angle with respect to the axis of the body 4 of more than 65° and preferably in the range of 70° to 85°. Moreover, in the structural component embodying the present invention the height or radial dimension of the lattice rods 6 is greater than the width of the individual strands and in a preferred arrangement would be three times greater than the width or in a more preferred arrangement at least ten times greater than the width.

With such angles relative to the axis of the coil-shaped body and with the considerable radial dimension of the lattice rods, the coil-shaped body cannot be manufactured on a conventional winding mandrel or it could be wound on such a mandrel only with considerable difficulty.

Figure 2:
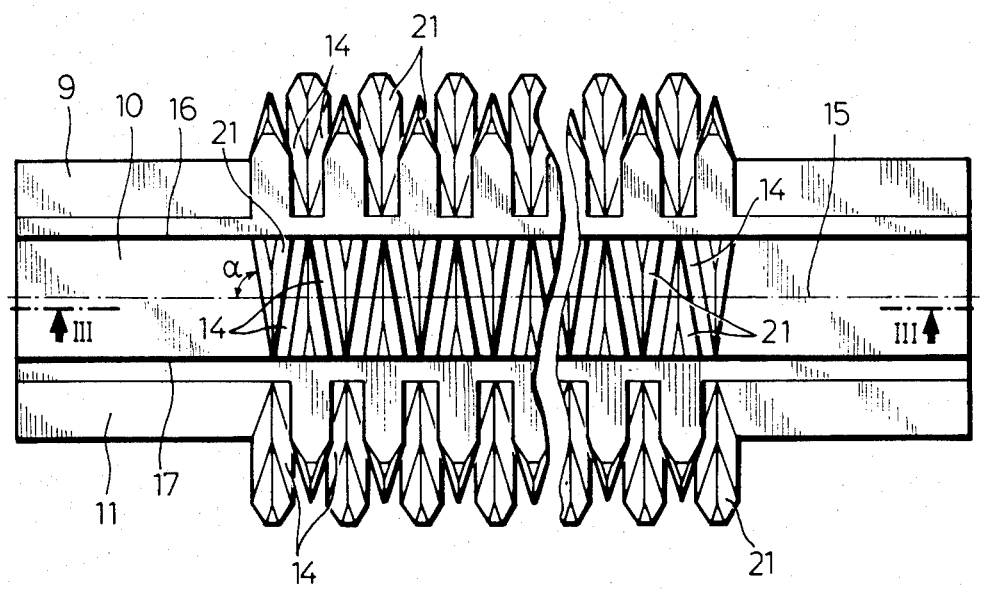
FIG. 2 is a plan view of a mandrel for winding the coil-shaped body of the structural component as shown in FIG. 1.
Figure 3:
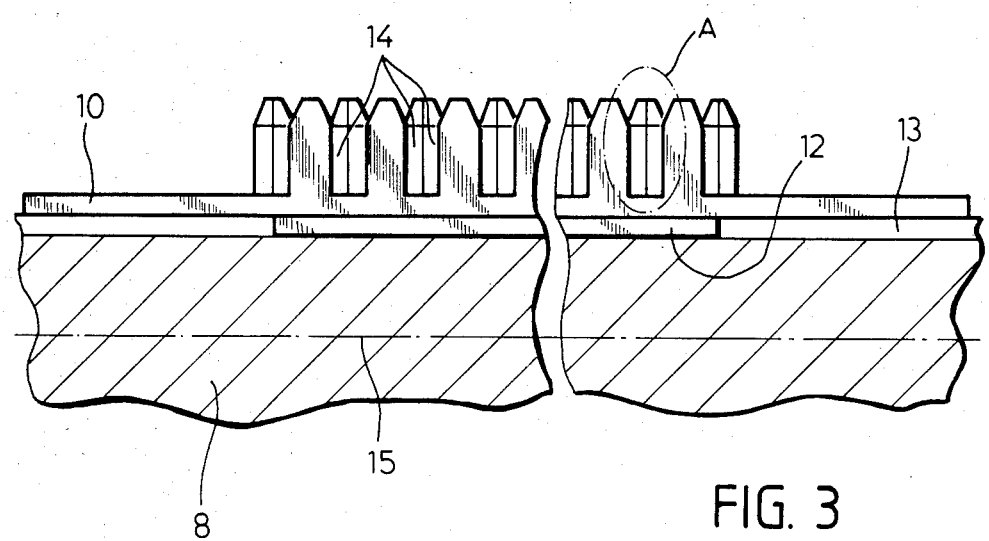
FIG. 3 is a partial sectional view taken along the line III—III in FIG. 2.
Figure 4:
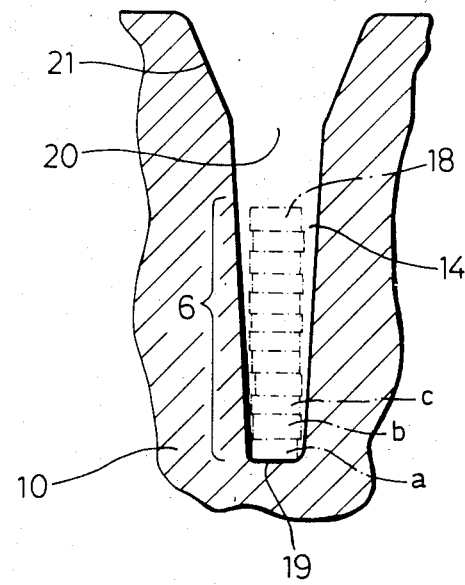
FIG. 4 is an enlarged detail view of the portion A in FIG. 3.

In FIGS. 2, 3 and 4 a winding mandrel is illustrated for fabricating the coil-shaped body 4 of the structural component 1 of the present invention.

The winding mandrel is made up of an axially extending core 8 having a radially outer circumferentially extending surface on which strips 9, 10 and 11 are placed. With the winding mandrel shown in FIGS. 2–4 a coil-shaped body 4 of hexagonal cross-section can be produced. Accordingly, the core 8 is hexagonal in cross-section with the strips 9–11 each extending along one of the six outer surfaces of the core with the strips located between the edges of the hexagonally shaped core 8. In the plan view of the mandrel displayed in FIG. 2, only the upper three strips 9, 10 and 11 are shown and not all six strips. To lock the strips in position on the periphery of the core, the strips are provided with a spring 12 which engages into a corresponding axial extending groove 13 in the core 8, note FIG. 3.

Each strip 9–11 is provided with a plurality of grooves 14. The grooves 14 extend at an angle $\alpha$ of approximately 80° relative to the axis 15 of the core 8. With the grooves extending in a crossing pattern, half of the grooves are arranged at an angle of plus 80° and the other half at an angle of minus 80°. At the edges 16, 17 of the mandrel or along the two long edges of the strips 9–11, the grooves converge in a V-shaped pattern with the tips or apices lying alternately first on one side and then on the other side or edge of strips.

The plastics material impregnated fiber strand is placed in the grooves 14 during the winding of the coil-shaped body 4. As a result, the lattice rods 6 form an angle of 80° with the axis of the core 8. In addition, the crossing locations or intersections 7 of the strands in the coil-shaped body 4 are positioned at the edges 16, 17 of the mandrel, that is, the location along the edges of the strips where the grooves 14 converge in a V-shaped fashion.

As displayed in FIG. 4, the grooves 14 have a width at the base 19 thereof generally equal to the width of the fiber strand 18. Moreover, the height or radial dimension of the grooves 14 is greater than the strand width by a considerable multiple. Accordingly, in the winding procedure, a lattice rod 6 is formed with a width corresponding to the width of the groove and a height corresponding at a maximum to the depth of the groove 14. Since the fiber strand 18 is relatively thin, a large number of fiber strand layers a, b, c etc. are formed in the groove 14 as shown in FIG. 4.

As can be noted in FIG. 4, each groove 14 is shaped so that its width increases from the groove base 19 in the radially outward direction toward the groove opening 20. A section 21 adjoins the groove opening providing outwardly flared surfaces extending from the groove opening 20 for facilitating the insertion of the strand 18 into the groove 14 as can be seen in FIG. 4.

After the fiber strand 18 is wound into the grooves 14 located in the strips 9–11, and after the fiber strand 18 is cured, the coil-shaped body 4 is removed from the mandrel first by withdrawing the hexagonally shaped core 8 so that the strips 9–11 can be displaced inwardly into the open space left by the core and then removed from the body 4. The removal is facilitated by the slight increase in width of each groove between the groove base 19 and the groove opening 20. Due to the relatively large height or radial dimension of the lattice rod as compared to their width, each lattice rod 6 is comparatively flexurally yielding when loaded transversely to its long direction and this is also true of the coil-shaped body.

Furthermore, it can be seen, in the hexagonal coil-shaped body described above that three crossing locations or intersections 7 are arranged in one radial plane. The flexural yieldability of the lattice rods 7 can be increased by providing as few as possible of the crossing locations, for instance, only two crossing locations 7 in one radial plane and thereby increasing the length of the lattice rods between adjacent crossing locations. To be sure, the increase in the flexural yieldability of the lattice rods or of the coil shaped body impairs its strength, since on one hand in total there are fewer crossing locations carrying the shear loads and, on the other hand, less fiber-reinforced plastics material relating to the cross-section area of the coil-shaped body 4 exits.

Moreover, it has been observed that the required flexural softness or yieldability can only be achieved in the coil-shaped body located between the steering gear and the steering column 3 if the angle with respect to the axis of the coil-shaped body is chosen to be as large as possible, with angles of 55° or less, a stiffening in the case of large crushing deformations occurs through increase of the cross-section, while with larger angles, for instance, around 80°, there is almost no increase in cross-section.

It has also been noted, due to the open lattice arrangement of the coil-shaped body 4, that the lattice rods 6 act as pure compression or tension members if the coil-shaped body is stressed in torsion and, therefore, are not subjected to shear loads. Instead, the shear loads act only at the crossing locations 7 and essentially independent of the angle of the lattice rods 6 with respect to the axis of the coil-shaped body 4. Such an open lattice structure behaves basically differently than a closed wound tube, which, as is known, can carry the maximum torsional stresses if the fiber strands are oriented at 45° relative to the axis of the tube, while with a greater angle of the fiber strand, higher shear stresses occur.

With higher torsional stresses, that is, when higher torque is transmitted, it has been seen, with the relatively great flexural yieldability of the coil-shaped body 4, that there is a tendency for the coil-shaped body to deform sidewise. This tendency is essentially caused by the same phenomenon as the formation of a noose when a wire or a hose is twisted.

Figure 5:
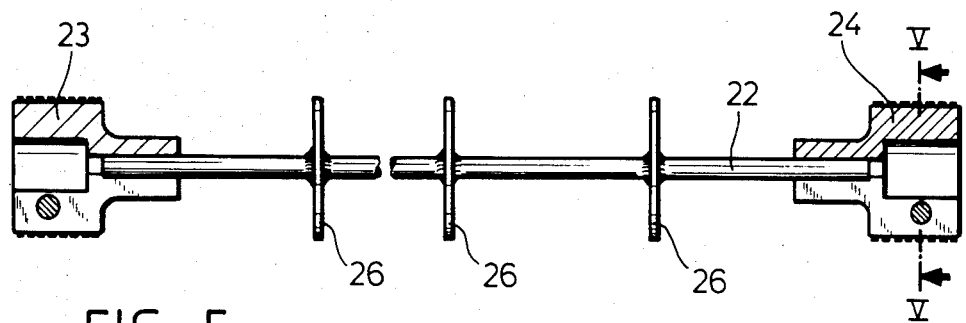
FIG. 5 is a sectional view through the structural component but without the coil-shaped body.
Figure 6:
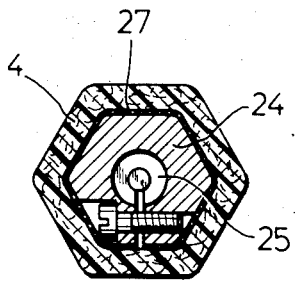
FIG. 6 is a sectional view taken along the line V—V in FIG. 5 and illustrating the coil-shaped body.

To counteract this tendency, a rod 22 is provided along the axis of the coil-shaped body 4 and, as can be seen in FIG. 5, the rod is attached at its opposite ends to connecting parts 23, 24. Connecting parts 23, 24 each include a slit bore 25, note FIG. 6, to enable a coaxial connection of the connecting parts 23, 24 with the drive shaft 5 of the steering gear 2 and with the steering column 3.

Disc-shaped abutments 26 extend transversely of and are arranged spaced apart along the rod 22 and bear on the coil-shaped body as depicted in FIG. 5. Accordingly, the rod 22 must be dimensioned so that it is not damaged by the stresses generated through the required degree of bending. On the other hand, the rod must be sufficiently stiff against the transverse forces at initial instability of the coil-shaped body 4. The flexural stiffness of the rod 22 is increased by forming it of uni-directional fiber-reinforced plastic material.

The coil-shaped body 4 has a continuous edge at its two end surfaces at which the connecting parts 23, 24 are attached. These end surfaces are produced by winding a fiber strand around the end of the coil-shaped body. Between the end surface of the coil-shaped body 4 and the connecting part 23 or 24 which could be formed of aluminum, a layer 27 of an elastomeric material, such as a synthetic rubber of the buna type is provided. A non-linear torsional stiffness is achieved with the elastomeric layer 27 in the range of lesser torque, which is advantageous in the application for the described safety steering column for the purpose of dampening or filtering of vibrations. In the case of smaller relative movements between the coil-shaped body 4 and the connecting parts 23,24, the elastomeric layer 27 is loaded only shear. In the event of larger relative movements, the positive lock, provided by the hexagonal shape of the coilshaped body and the corresponding hexagonal shape of the connecting parts 23, 24, causes an additional compression of the elastomeric layer 27 and thus an increase in torsional rigidity.

The structural component 1 can be varied in many ways and adapted to the most diverse applications depending on the purpose and the required magnitude of torque and bending angle. It is possible to use glass fibers, aramid fibers, carbon fibers or metal fibers for the fiber-reinforced plastics material of the coil-shaped body 4, while the plastics material matrix can be formed from epoxide resins, polyester resins or polyamide resins.

Furthermore, the angle of the lattice rods 6 relative to the axis of the coil-shaped body 4 can be varied between more than 55° up to almost 90°, that is, the point at which a lattice-shaped structure is still possible, with the flexural yieldability increasing with the increasing angle of the lattice rods relative to the axis of the body. The cross-sectional shape of the coil shaped body can be changed whereby with a polygonal cross-section (octogon, hexagon, pentagon, square, triangle) the previously mentioned positive locking with the connecting parts 23, 24 is of advantage, and also the relatively simple design of the winding mandrel previously described in connection with FIGS. 2 to 4. In comparison, a circular cross-section of the coil-shaped body 4 has the advantage, contrary to the polygonal cross-section, that one is not bound to a specific multiple pattern, such as a three-fold pattern with a hexagonal cross-section or a four-fold pattern with an octogonal cross-section of the coil-shaped body 4 or the mandrel, rather any desired pattern can be wound.

The flexural yieldability can be adapted to any desired purpose by the dimensioning of the lattice rods 6 particularly by varying the height or radial dimension of the lattice rods as compared to the width, and also by means of other dimensional paramaters, for instance, the length and the diameter of the coil-shaped body 4. The number of layers of the fiber strand 8 relative to the overall wound body should be as great as possible, because the quantity of the shear plane at the crossing locations 7 between the individual fiber strand layers is increased so that it is preferable to select fiber strands 18 with as few individual fibers as possible, inasfar as this can be justified from the required production time point of view.

While specific embodiments of the invention have been shown and described in detail to illustrate the application of the inventive principles, it will be understood that the invention may be embodied otherwise without departing from such principles.

We claim:

1. Structural component for interconnecting and transmitting torque, such as for use in a safety steering arrangement with a bent steering solumn, comprising an axially extending first member having a free end, an axially extending second member having a free end spaced from the free end of said first member, the axis of said first member disposed at an angle to the axis of said second member, an axially extending coil-shaped body formed of fiber-reinforced plastics material lattice rods wound around the axis of the body, said coil-shaped body having a first end and a second end spaced apart in the axial direction thereof with the first end connected to the free end of said first member and the second end connected to the free end of said second member with said coil-shaped body being arcuately shaped in the axial direction thereof between the first and second ends, said lattice rods formed of a plurality of layers of a plastics material impregnated fiber strand with the lattice rods disposed in crossing relation, the dimension of said lattice rods in the radial direction being greater than the width thereof, the radial dimension of said lattice rods amounts to at least three times the width of said rods extending generally in the axial direction of said coil-shaped body, and the angle of said lattice rods relative to the axis of said body is in the range of 70° to 85°.

2. Structural component, as set forth in claim 1 wherein said coil-shaped body includes a flexurally elastic rod extending therethrough in the axial direction of said body, and at least two abutments located in spaced relation along said rod with said abutments bearing against the inner surface of said coil-shaped body.

3. Structural component, as set forth in claim 2, wherein said rod is formed of unidirectional fiber-reinforced plastics material.

4. Structural component, as set forth in claim 1, wherein a continuous end surface formed at each of the first and second ends of said coil-shaped body, and a connecting part secured to each of the first and second ends for attaching the structural component to said first and second members.

5. Structural component, as set forth in claim 4, wherein said coil-shaped body has a uniform polygonal cross-section at least in the region of said connecting parts.

6. Structural component, as set forth in claim 5, wherein a layer, of an elastomeric material is provided at the first and second ends of said coil-shaped body so that the layer is located between said coil-shaped body and said connecting parts.

* * * * *